June 29, 1954     C. F. WEIGANDT     2,682,128
ARTIFICIAL FISH LURE FOR SURFACE AND UNDERWATER FISHING
Filed Sept. 8, 1952     2 Sheets-Sheet 1
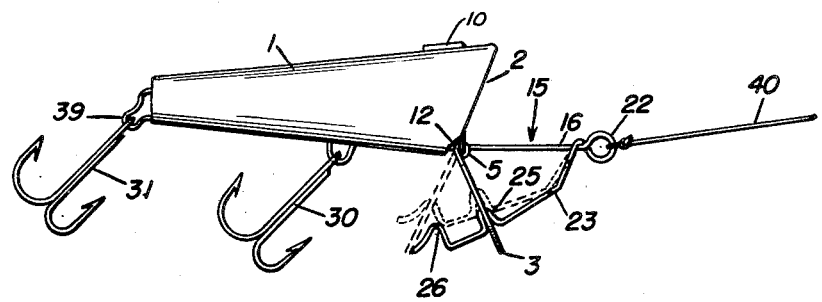
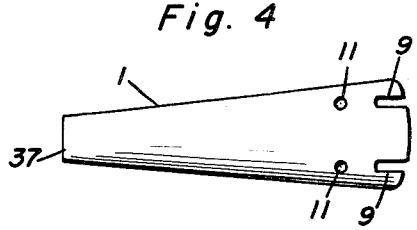
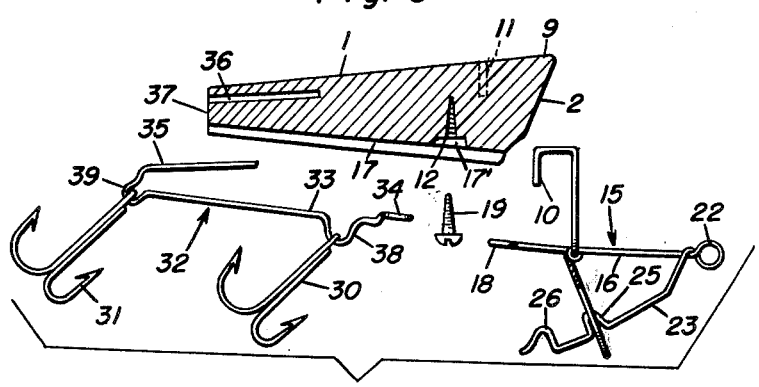
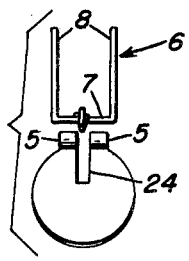
Carl F. Weigandt
INVENTOR.

June 29, 1954  C. F. WEIGANDT  2,682,128
ARTIFICIAL FISH LURE FOR SURFACE AND UNDERWATER FISHING
Filed Sept. 8, 1952  2 Sheets-Sheet 2
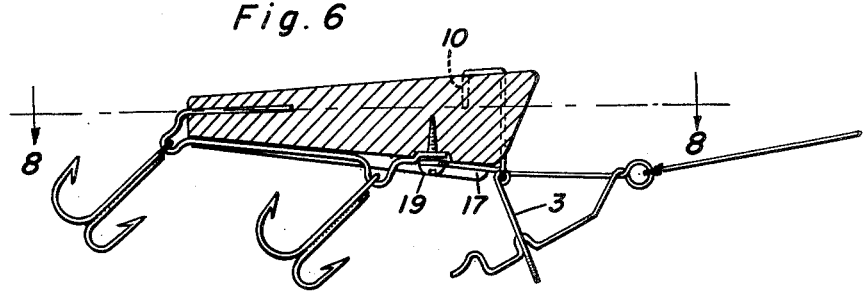
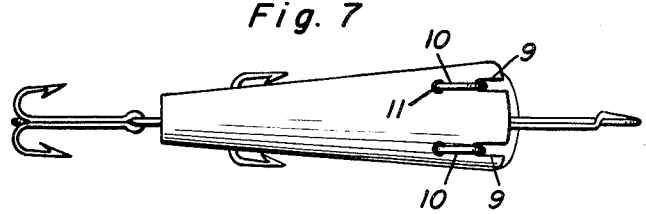
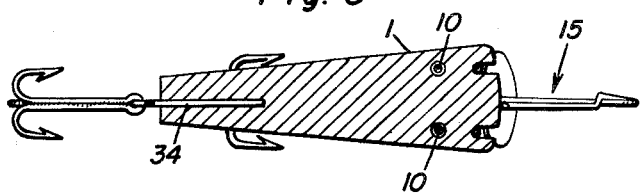
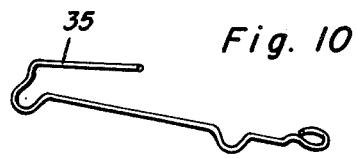
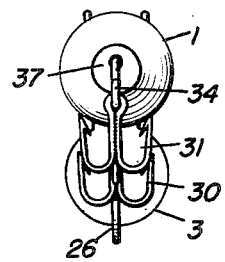
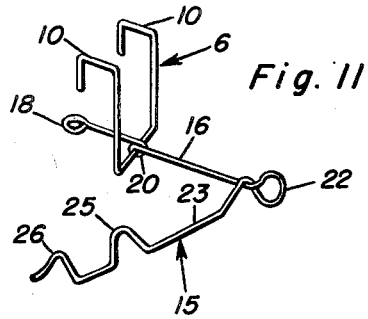
Carl F. Weigandt
INVENTOR.
BY *Clarence A. O'Brien*
and *Harvey B. Jackson*
Attorneys Patented June 29, 1954

2,682,128

UNITED STATES PATENT OFFICE 2,682,128

ARTIFICIAL FISH LURE FOR SURFACE AND UNDERWATER FISHING

Carl F. Weigandt, Memphis, Tenn., assignor of fifty per cent to Wylie E. Turner, Jr.

Application September 8, 1952, Serial No. 308,391

2 Claims. (Cl. 43—42.22)

My invention relates to improvements in artificial fish lures of the type equipped for surface fishing and for submerging for under water fishing.

The primary object of my invention is to provide such a lure with efficient, quick-acting, deflecting means to cause the same to submerge for under water fishing under steady pull on the line, or, to dive intermittently under short jerks on the line with a splashing action for attracting fish.

Another object is to provide means for the purpose above set forth in the form of a deflecting vane swingable into a deflecting position to cause the lure to submerge, together with means for locking the vane in deflecting position with a snap action.

Another object is to provide in such a lure, a plug equipped with deflecting means for the above purposes, the plug being shaped to cause a splash when the plug dives.

Still another object is to provide means for quickly and easily attaching the deflecting means and a plurality of gang hooks to the plug without the use of a number of screws, or the like.

Sill another object is to provide a fish lure for the above purposes, which is simply constructed and inexpensive to manufacture and use.

Other and subordinate objects, within the purview of my invention, together with the precise nature of my improvements will be readily understood when the succeeding description and claims are read with reference to the drawings, accompanying and forming part of this specification.

In said drawings:

Figure 1 is a view in side elevation of my improved lure in the preferred embodiment thereof;

Figure 2 is a view in front elevation;

Figure 3 is an exploded view of the parts of the lure with the plug shown in longitudinal vertical section;

Figure 4 is a view in plan of the plug detached;

Figure 5 is an exploded view in front elevation of the deflecting vane and the yoke forming part of the mounting means for the vane;

Figure 6 is a view in longitudinal section taken on the line 6—6 of Figure 2;

Figure 7 is a view in plan of the lure with the hook holder, deflecting vane and vane mounting means and the locking means attached;

Figure 8 is a view in horizontal section taken on the line 8—8 of Figure 6;

Figure 9 is a view in rear elevation;

Figure 10 is a detail view in perspective of the hook holder; and

Figure 11 is a detail view in perspective of the yoke and the locking member for the deflecting vane.

Referring now to the drawings by numerals, my improved fish lure comprises a buoyant plug 1 substantially circular in transverse section and rearwardly tapering form, preferably of wood for turning in a lathe, and having a flat front end 2 oblique to the longitudinal axis of the plug 1 and slanting upwardly and forwardly for a purpose presently seen.

The plug 1 is provided at the front end 2 thereof with means for causing the same to submerge under pull on the line and which comprises, as its primary element, a flat, substantially circular deflecting vane 3 transverse to said plug.

The vane 3 is mounted on the plug 1, by means described, said vane being swingable into a downwardly and rearwardly inclined position relative to the axis of the plug 1 to cause the plug to act at the surface in a manner presently described, said vane being swingable into a forwardly and downwardly inclined position relative to said axis to cause the plug 1 to submerge.

The means for mounting the vane 3 comprises a pair of hinge barrels 5 formed on the top edge of the vane 3, and a U-shaped resilient, wire yoke 6 having a straight end 7 extending through said barrels 5, and a pair of legs 8 set into a pair of vertical grooves 9 in the front end 2 of the plug 1 with right angled terminal hooks 10 projecting downwardly in a pair of top bores 11 in said plug. The barrels 5 are set into a transverse bottom groove 12 in the front end 2 of the plug 1 so that said barrels 5 will not project below the bottom of the plug.

Locking means is provided for holding the vane 3 in either of its described positions comprising a substantially V-shaped, resilient wire locking member 15 having a straight leg 16 extending forwardly of the front end 2 at the bottom of the plug 1 with a rear end portion fitted in a longitudinal bottom groove 17 in the plug 1 and terminating in a rear end eye 18 by means of which and a screw 19 in the bottom of the plug 1 adjacent its front end 2, said leg is attached to said plug to extend between the hinge barrels 5. An eye 20 in said leg 16 is positioned between the hinge barrels 5 and through which the end 7 of the yoke 6 extends, whereby said leg 16 prevents the legs 8 of the yoke 6 from being bent forwardly out of the grooves 9.

The locking member 15 is bent intermediate its ends to form a front end line attaching eye 22 on said member and a flexible locking leg 23 extending downwardly and rearwardly from said eye 22 and reacting downwardly.

The locking leg 23 extends through a radial top slot 24 in the vane 3 and is provided with a pair of longitudinally spaced, upstanding, front and rear bends 25, 26 therein, which, under reaction of the locking leg 23 will straddle the vane 3 at the bottom of the slot 22 with a snap action to lock said vane, the bend 25 locking the vane in downwardly and forwardly inclined position, and the bend 26 locking said vane in downwardly and rearwardly inclined position. Obviously, by springing the locking leg 23 upwardly, as shown in dotted lines in Fig. 1, the vane 3 may be unlocked in either position thereof.

In addition to the foregoing, my invention comprises means for attaching a pair of gang hooks 30, 31 to the plug 1 adjacent the front and rear ends of said plug. This means comprises a substantially U-shaped resilient wire, hook holder 32 extending longitudinally of the plug 1 and having a bottom leg 33 lying in the groove 17 and fixed therein by a front end eye 34 on said leg through which the before mentioned screw 19 extends and clamps said eye in a bottom seat 17' in the plug 1. Thus the single screw 19 secures both the locking member 15 and the hook holder 32 to the plug 1. The hook holder 32 further includes a short leg 35 inserted in a longitudinal bore 36 in the rear end 37 of the plug 1 to hold said hook holder in a vertical plane. A front depending bend 38 in the bottom leg 33 adjacent the front end eye 34 of the leg suspends the gang hooks 30 adjacent the front end of the plug 1. A rear end loop 39 forming the bight of the hook holder 32 suspends the gang of hooks 31 at the rear end 37 of the plug 1.

Referring now to the operation of the invention, when the deflecting vane 3 is in downwardly and forwardly inclined position, as shown in Figures 1 and 6, and locked in that position in the manner described, said vane will deflect the plug downwardly to cause the same to submerge under constant pull on the line 40, for under water fishing. When said vane 3 is in its downwardly and rearwardly inclined position, as shown in dotted lines in Figure 1, and locked in that position, it will augment the front end 2 of the plug 1 to deflect the plug upwardly and causes the same to float with a jumping action on the surface of the water for surface fishing. When the plug 1 is floating with the vane 3 locked in the forwardly and downwardly inclined position, the plug 1, under short jerks on the line 40 will dive intermittently with the rear end 37 up and the front end 2 hitting the water with sufficient force to cause splashing for attracting fish.

As will be manifest, the yoke 6, locking member 16 and hook holder 32 are secured to the plug 1 by means including a single screw so that the parts of the plug are easily and quickly put together and taken apart.

The foregoing will, it is believed, suffice to impart a clear understanding of my invention, without further explanation.

Manifestly, the invention, as described, is susceptible of modification, without departing from the inventive concept, and right is herein reserved to such modifications as fall within the scope of the appended claims.

Having described the invention, what is claimed as new is:

1. A fishing lure comprising a buoyant plug having a front end, a substantially circular deflector vane, hinge means mounting said vane on the front end of the plug transversely of said plug to depend therefrom for swinging into forwardly and downwardly inclined position to cause the plug to submerge under pull of a line, a line attaching member fixed to and extending forwardly of said plug, a resilient leg on said member inclined downwardly and rearwardly and lockably engaging said vane to maintain the vane in said position, and hook carrying means attached to said plug, said hinge means comprising a yoke on which said vane is pivoted and having legs set into said front end and terminating in hooks inserted into said plug.

2. A fishing lure comprising a buoyant plug having a front end, a substantially circular deflector vane, hinge means mounting said vane on the front end of the plug transversely of said plug to depend therefrom for swinging into forwardly and downwardly inclined position to cause the plug to submerge under pull of a line, a line attaching member fixed to and extending forwardly from said plug, a resilient leg on said member inclined downwardly and rearwardly and lockably engaging said vane to maintain the vane in said position, and hook carrying means attached to said plug, said hinge means comprising a yoke on which said vane is pivoted and having legs set into said front end and terminating in hooks inserted into said plug, said yoke supporting said member intermediate the ends of the member.

References Cited in the file of this patent

UNITED STATES PATENTS

| Number | Name | Date |
|---|---|---|
| 1,220,921 | Wilson | Mar. 27, 1917 |
| 1,232,211 | Burkman | July 3, 1917 |
| 1,320,570 | Reynolds | Nov. 4, 1919 |
| 2,112,901 | Anderson | Apr. 5, 1938 |
| 2,204,552 | Singleton | June 18, 1940 |
| 2,495,134 | Roberts | Jan. 17, 1950 |
| 2,503,369 | Wycech | Apr. 11, 1950 |
| 2,580,733 | Cowden | Jan. 1, 1952 |
| 2,615,274 | Slough | Oct. 28, 1952 |